May 17, 1966  G. A. MOE ETAL  3,251,568
ADJUSTABLE SUPPORT MECHANISM
Filed April 29, 1964
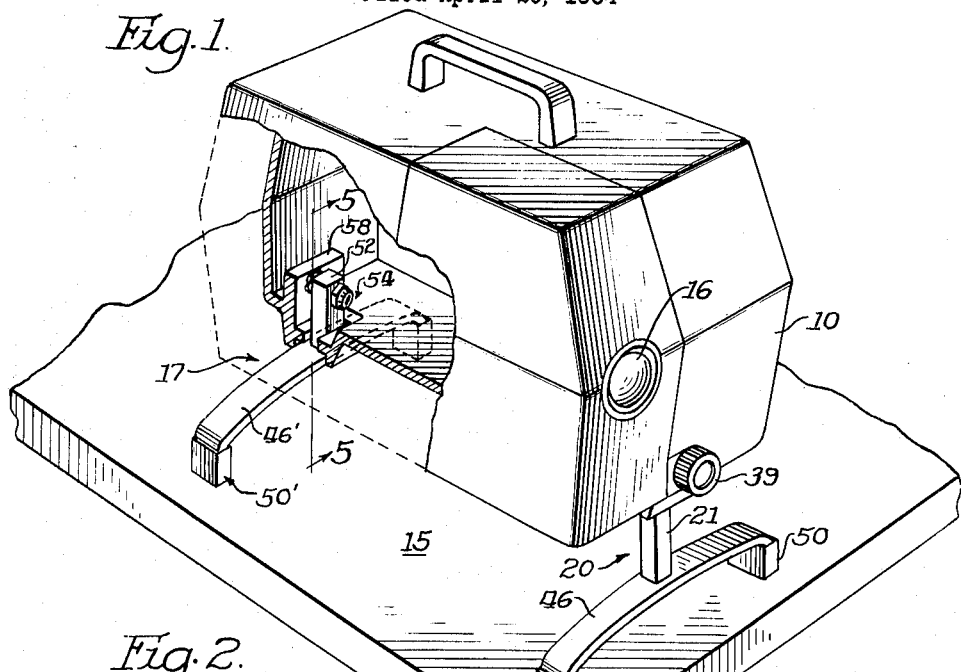
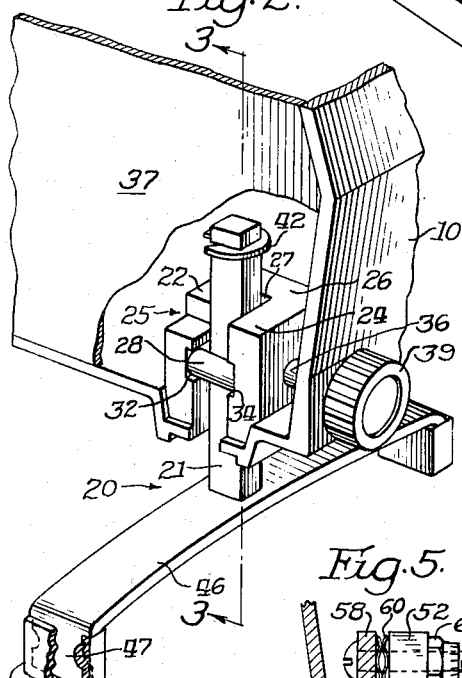
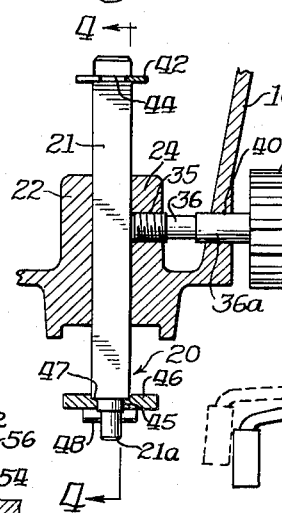
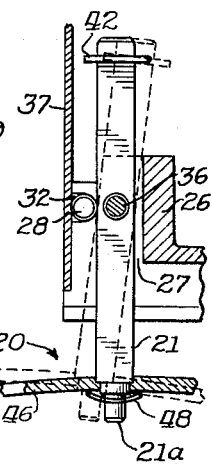
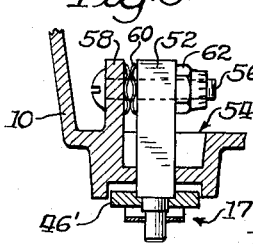
Inventors
Gerald A. Moe
Jack W. Thomsen
By Barry L. Clark
John E. Peele Jr.  Attys

United States Patent Office 3,251,568
Patented May 17, 1966

3,251,568
ADJUSTABLE SUPPORT MECHANISM
Gerald A. Moe, Buffalo Grove, and Jack W. Thomsen, La Grange Park, Ill., assignors to Bell & Howell Company, Chicago, Ill., a corporation of Illinois
Filed Apr. 29, 1964, Ser. No. 363,546
11 Claims. (Cl. 248—11)

The present invention relates to an improved adjustable support mechanism for readily permitting and maintaining both elevational and leveling adjustment of a portable device, for example, a still or motion picture projector, such that the device may be positioned as desired on any relatively horizontal support surface.

The general object of the invention is to provide an adjustable support mechanism which permits one end of a device to be adjustably elevated relative to a support surface and maintained in such adjusted position, and which further permits the device to be bodily leveled relative to the support surface by application of manual pressure to a portion of the device casing while the elevational adjustment is maintained.

Further objects of the invention will appear from the description as hereinafter set forth in connection with the appended claims and the accompanying drawings wherein:

FIGURE 1 is a perspective view of a typical projector in one of the several positions to which it can be adjusted, with the casing broken away in part.

FIGURE 2 is a perspective view of a portion of a typical projector casing broken away in part to disclose details of a novel adjustable support assembly and the cooperating structure of the casing.

FIGURE 3 is a sectional view of an assembly of the mechanism taken along line 3—3 of FIGURE 2.

FIGURE 4 is a sectional view of the assembly of the mechanism taken along line 4—4 of FIGURE 3.

FIGURE 5 is a sectional view of another assembly of the mechanism taken along line 5—5 of FIGURE 1.

The adjustable support mechanism includes a tilt leg assembly, a leveling assembly and a locking assembly cooperating with a casing. The tilt leg elevating-leveling assembly includes a leg member, one end of which is insertable into a socket in what is usually the forward portion of the projector casing, and the other end of which carries a foot supporting beam having on the ends thereof support surface contacting feet. The portion of the leg inserted into the socket is arranged so as to be capable of substantially vertical telescoping motion into the casing for elevation of the forward portion and tilting action about a fulcrum member which forms the axis for the tilting movement for leveling action. A locking assembly comprising a threaded locking member and a knob for operating the locking member serves to retain the inserted portion of the tilt leg assembly in the socket in a manner such that it is adapted to be readily adjustable, yet positively retained for elevational adjustment and continually adjustable for leveling. Cooperating with the tilt leg assembly in permitting adjustment of the casing is a leveling assembly including a leg member pivotably supported in the rearward portion of the casing. The operator may tilt the casing relative to the support surface through a small angle about a pivot member which includes means frictionally restricting movement of the leg member as adjusted in the socket.

In FIGURE 1 is disclosed a casing 10 of a typical still or motion picture projector as normally supported on a table or other substantially horizontal support surface 15. The surface may have a slight inclination from the horizontal plane in either or both directions relative to the axis of projection through lens 16. The rearward end of the projector is supported upon an adjustable leveling assembly 17 which forms at least one point of support of the casing on the surface and will be later described. The projector is shown positioned with the forward tilt leg assembly 20 extended and maintained in an adjusted position such that the forward portion of the casing is elevated slightly to vertically locate an image which would be projected on a screen or other projection area (not shown) by the projector. The projector casing is further slightly inclined relative to tilt leg assembly 20 and support surface 15 such that the projection axis is leveled by tilting to compensate for an inclination of the support surface relative to the horizontal surface of the screen.

Disclosed in FIGURE 2 is a portion of the casing 10 in which is integrally formed a socket frame 25 into and through which the leg 21 of tilt leg assembly 20 is longitudinally movable. The leg is maintained in a generally upright position in the substantially U-shaped socket frame by the side plates 22, 24 and the back plate 26. The side plates restrict pivoting motion of the leg 21 in forward and rearward directions relative to the direction of projection. Back plate 26 form a lateral motion limiting surface of the slot 27 between the side plates 22, 24 when assembly 20 is tilted relative to the casing for leveling relative to an inclined support surface (as seen in broken lines in FIGURE 4). The other lateral motion limiting surface is in the form of a fulcrum member 28, such as a cylinder of either solid or tubular construction. The fulcrum is positioned in recesses 32, 34 in the side plates 22, 24, respectively, and is retained therein by an interior casing plate 37 which is removably attached to the casing by the conventional means.

Formed in side plate 24 of socket frame 25 is an aperture 35 through which is threaded a portion of locking member 36. A knob 39, exterior of casing 10, is fixed against rotation on the outer end of locking member 36 to permit manual rotation of the locking member until the inner end thereof contacts a surface of leg 21 to positively retain the leg in an adjusted position by frictionally holding the leg against side plate 22. A substantially smooth rounded portion 36a of the locking member 36 extends through an aperture 40 in the casing to permit axial and rotary motion of the locking member relative to the casing as it is adjusted.

When the locking member 36 is released, tilt leg assembly 20 including leg 21 and beam 46 is prevented from slipping from socket frame 25 by a retainer, such as a lock washer 42, which is snapped around a groove 44 near the upper end of leg 21. The lower end of leg 21 extends into an aperture 45 in a beam 46, which beam has a recess 47 around the aperture to accept the lower portion of the substantially rectangular leg and prevent rotation of the beam relative to the leg. Aperture 45 in beam 46 is shaped to accept a reduced end portion 21a of leg 21 on which is securely slipped a spring nut 48. The ends of the beam are bent substantially parallel to the leg to form support surface contacting feet 47 on which are snugly fitted surface protectors 50, which may be formed of plastic or rubber, to protect support surface 15 from damage by the projector.

The forward leg member may be extended beneath the casing any amount of its effective length and the casing leveled at that point since the locking member may be brought into engagement with the leg at any point along its length. The fulcrum member is positioned sufficiently close to the axis about which the leg tilts such that minimum torque is created between the leg and the engaging end of the locking member when the casing is tilted relative to the leg.

A leveling assembly 17 supports the rearward portion of the projector. This assembly, as seen in FIGURES 1 and 5, includes a leg 52 which extends into a mounting portion 54 of casing 10. The leg is pivotally mounted on a screw member 56 extending through a wall plate 58 forming a side of the mounting portion. Between the wall plate 58 and leg 52 are located a pair of compressible spring washers 60 against which leg 52 is held by a lock nut 62 threaded on pivot member 56. The lock nut is tightened sufficiently to partially compress the washers and frictionally retain the leg member in an adjusted position, yet permit the frictional engagement to be sufficiently loose to allow adjustment of the leg member and leveling of the casing.

The surface contacting foot portions 50' and the beam 46' of the leveling leg assembly are mounted on the lower end of leg 52 in the manner as previously described with respect to tilt leg assembly 20.

In the handling of the adjustably supported casing, the casing is placed on a substantially horizontal support surface in a position substantially aligned with a projection area on which an image is to be projected. With the leveling leg assembly in contact with the support surface, the locking assembly is loosened to allow the tilt leg assembly to be extended from the casing. The forward end of the projector is then adjusted as to elevation until the projected image is aligned within the vertical extent of the projection area. The locking assembly is then tightened to force the leg member into engagement with one side plate of the socket frame. The operator may then level the projected image with the projection area by pivoting the casing relative to the leg assemblies and the support surface without readjusting the locking assembly. This leveling adjustment is accomplished by manual application of pressure on an exterior portion of the casing, laterally of the pivot axes through the leg assemblies, in the direction in which the operator intends to lower that side of the casing and the projected image.

In the instant specification, a preferred embodiment has been described; however, it is not intended to limit the invention to the details set forth with respect thereto, since modifications may be made without departing from the spirit of the invention as defined in the claims.

We claim as our invention:

1. A support mechanism for providing vertical and tilting adjustment of a casing comprising:
   a fulcrum member supported within said casing;
   a leg assembly;
   means for mounting said leg assembly for substantially vertical longitudinal movement relative to said casing and tilting movement about said fulcrum member; and
   means for selectively locking said leg assembly against said longitudinal movement while permitting said leg assembly to be tilted about said fulcrum member.

2. A support mechanism for a casing comprising:
   a fulcrum member supported in said casing;
   an elongated leg member contacting the fulcrum member and mounted for longitudinal movement in a direction substantially perpendicular to the line of contact between said leg member and said fulcrum member, and for tilting movement about said fulcrum member;
   locking means for retaining said leg member against said longitudinal movement;
   a beam on an end of said leg member; and
   support surface contacting portions on said beam.

3. A support mechanism for a casing comprising:
   a socket frame in said casing;
   a fulcrum member in said socket frame;
   a leg member longitudinally and tiltably movable in said socket frame relative to said fulcrum member; and
   manually adjustable locking means extending into said socket frame and adapted to engage said leg member to retain said leg member in a longitudinally adjusted position while permitting said leg member to be tilted relative to said casing by the application of manual pressure to the exterior of said casing.

4. An adjustable support mechanism for a casing comprising:
   a socket frame in said casing;
   said socket frame including a pair of side plates;
   a fulcrum member supported between said plates;
   a leg member mounted for longitudinal adjustable movement in said socket frame between said plates;
   said leg member being adapted to be tilted relative to said fulcrum member; and
   locking means adjustably threadable through one of said plates into contact with said leg member to retain said leg member in a longitudinally adjusted position while permitting tilting adjustment when so retained.

5. An adjustable support mechanism for a casing comprising:
   a U-shaped member comprising side plates and a back plate;
   a fulcrum member between said side plates and spaced from said back plate;
   a leg member slidably mounted for movement in said U-shaped member;
   said leg member being adapted to be tilted about said fulcrum member; and
   locking means extending into one of said side plates to frictionally retain said leg member against said other side plate in a longitudinally adjusted position while permitting tilting adjustment when so retained.

6. An adjustable support mechanism for a casing, comprising:
   a substantially U-shaped socket frame in said casing;
   a fulcrum in said socket frame;
   an elongated leg member mounted for longitudinal movement in said socket frame relative to said fulcrum member and tilting movement about said fulcrum member; and
   a manually operable locking member threadable through said socket frame into pressure engagement with said leg member at a point adjacent said fulcrum member whereby said leg member is adapted to be moved to a longitudinally adjusted position relative to said casing and retained in said longitudinally adjusted position when engaged by said locking member, while permitting manual tilting adjustment of the casing relative to the leg member by the application of manual pressure to the exterior of said casing.

7. A support mechanism for a casing adapted to be supported on a support surface comprising:
   a substantially U-shaped socket frame in said casing;
   a fulcrum member supported in said socket frame;
   an elongated leg member, one end of which extends within and through said socket frame;
   said leg member being mounted for longitudinal and tilting movement relative to said fulcrum member;
   a beam having a pair of support surface contacting portions thereon;
   said beam being attached to the end of said leg member exterior of said casing; and
   a manually operable locking member extending into said socket frame, one end thereof being adapted to be brought into pressure engagement with said leg member adjacent said fulcrum member;
   whereby said leg member is retained against further longitudinal movement while said casing remains tiltable relative to the support surface.

8. An adjustable support mechanism for a casing adapted to be supported on a support surface, comprising:
   a substantially U-shaped socket frame in said casing;
   said socket frame comprising a pair of side plates and a back plate;
   a fulcrum member supported on said side plates and spaced from said back plate;
   an elongated leg member mounted for longitudinal movement in said socket frame and for tilting movement about said fulcrum; and locking means threadably adjustable through one of said side plates into engagement with said leg member to retain said leg member frictionally engaged against said other side plate in a longitudinally adjusted position while permitting said casing to be tiltably moved relative to said support surface.

9. The adjustable support mechanism of claim 8 including a beam on an end of said leg member; and support surface contacting portions on said beam.

10. An adjustable support mechanism for a casing adapted to be adjusted in two directions relative to a substantially horizontal surface, comprising:

a socket portion and a mounting portion spaced in said casing;

fulcrum means in said socket portion;

an elongated leg member supported for longitudinal movement in said socket portion to support said casing relative to said surface and for tilting movement about said fulcrum means;

locking means extending into said socket portion to retain said leg member in said longitudinally adjusted position; and a second leg member to support said casing relative to said surface;

and means for mounting said second leg member for frictionally restrained movement in said mounting portion whereby said casing may be tiltably adjusted relative to said leg members and said surface while said first leg member is maintained in its longitudinally adjusted position.

11. An adjustable support mechanism for a casing adapted to be adjusted in two directions relative to a substantially horizontal support surface, comprising:

a socket frame and a mounting portion in said casing;

said socket frame comprising a pair of side plates and a back plate;

a fulcrum means supported on at least one of said side plates and spaced from said back plate;

an elongated leg member longitudinally and tiltably movable in said socket frame relative to said fulcrum means;

locking means threadably adjustable through one of said side plates into engagement with said leg member to retain said leg member frictionally engaged against said other side plate in a longitudinally adjusted position;

a second elongated leg member and means for mounting it for tilting movement in said mounting portion;

a beam on an end of each of said leg members; and support surface contacting portions on each said beam wherein said casing may be tilted relative to both said leg members and the support surface.

References Cited by the Examiner

UNITED STATES PATENTS

| | | | |
|---|---|---|---|
| 2,298,087 | 10/1942 | Stechbart | 248—11 |
| 2,939,659 | 6/1960 | Koskela | 248—11 |
| 3,058,794 | 10/1962 | Barber | 312—253 X |

CLAUDE A. LE ROY, *Primary Examiner.*

J. PETO, *Assistant Examiner.*